US007025261B2

(12) United States Patent
Lagosanto et al.

(10) Patent No.: US 7,025,261 B2
(45) Date of Patent: Apr. 11, 2006

(54) METHOD AND SYSTEM FOR MANAGING DATA DESIGNED TO BE STORED IN A PROGRAMMABLE SMART CARD

(75) Inventors: Laurent Lagosanto, Marseilles (FR); François Millet, La Ciotat (FR); Jean-Jacques Vandewalle, Villeneuve d'Ascq (FR)

(73) Assignee: Gemplus, Gemenos Cedex (FR)

( * ) Notice: Subject to any disclaimer, the term of this patent is extended or adjusted under 35 U.S.C. 154(b) by 22 days.

(21) Appl. No.: 10/474,742

(22) PCT Filed: Apr. 9, 2002

(86) PCT No.: PCT/FR02/01235

§ 371 (c)(1),
(2), (4) Date: Feb. 27, 2004

(87) PCT Pub. No.: WO02/084610

PCT Pub. Date: Oct. 24, 2002

(65) Prior Publication Data

US 2004/0144838 A1    Jul. 29, 2004

(30) Foreign Application Priority Data

Apr. 10, 2001 (FR) .................................. 01 04889

(51) Int. Cl.
*G06K 5/00* (2006.01)

(52) U.S. Cl. ..................................... 235/385; 235/382

(58) Field of Classification Search ................ 235/380, 235/375, 492, 385, 383, 491, 449, 379, 482, 235/382, 494; 705/75, 64, 41, 65; 713/200
See application file for complete search history.

(56) References Cited

U.S. PATENT DOCUMENTS

| 4,825,054 | A | * | 4/1989 | Rust et al. ................... 235/380 |
| 5,889,941 | A | * | 3/1999 | Tushie et al. ............... 713/200 |
| 6,005,942 | A | | 12/1999 | Chan et al. |
| 6,014,748 | A | * | 1/2000 | Tushie et al. ............... 713/200 |
| 6,138,005 | A | * | 10/2000 | Park ........................... 455/411 |
| 6,298,336 | B1 | * | 10/2001 | Davis et al. .................. 705/41 |
| 6,402,028 | B1 | * | 6/2002 | Graham et al. ............. 235/380 |
| 6,588,673 | B1 | * | 7/2003 | Chan et al. .................. 235/492 |
| 6,718,314 | B1 | * | 4/2004 | Chaum et al. ................ 705/64 |
| 2003/0050899 | A1 | * | 3/2003 | Tushie et al. ................. 705/65 |
| 2003/0097344 | A1 | * | 5/2003 | Chaum et al. ................ 705/75 |
| 2004/0144472 | A1 | * | 7/2004 | Cowie .......................... 156/64 |

FOREIGN PATENT DOCUMENTS

WO        99/52065       10/1999

* cited by examiner

*Primary Examiner*—Thien M. Le
(74) *Attorney, Agent, or Firm*—Buchanan Ingersoll PC

(57) ABSTRACT

Data to be stored is managed in different management modes including at least a first management mode and a second management mode. An identification is provided during a data preparation phase, for respectively identifying the data to be managed according to the different modes, and then managing on the basis of the provided identification. The storage can be located in a programmable smart card. Thus the data can include a code associated with an application whereof part (management code) is designed to customize the application during an initial phase, the identification being related to the data associated with this code part.

39 Claims, 4 Drawing Sheets

METHOD AND SYSTEM FOR MANAGING DATA DESIGNED TO BE STORED IN A PROGRAMMABLE SMART CARD

This disclosure is based upon French Application No. 01/04889, filed on Apr. 10, 2001 and International Application No. PCT/FR02/01235, filed Apr. 9, 2002, the contents of which are incorporated herein by reference.

BACKGROUND OF THE INVENTION

The invention concerns the management of data to be loaded in memory for optimising the storage possibilities. The data in question can be in particular of the code constituting a program of the "application" type, intended to be loaded in a memory of a communicating device, such as a programmable smart card or the like.

With the advent of programmable smart cards, it is possible to load service applications therein, that is to say executable software programs, coming from various sources. To this end, an open card comprises rewritable memory spaces for storing in an open-ended fashion one or more service applications according to its use, like a hard disk on a personal computer, as far as a processor able to execute such applications.

These service applications, also known by the English term "card applets", are generally designed by service providers authorised by the smart card issuer, for example banking and health bodies, distributors and other service providers. They are in the form of complex programs, generally designed by means of high-level languages such as Java, C++ or Microsoft Windows Basic, so as to be transferred in a block into the card memory, either when it is manufactured (pre-issue loading) or subsequently during its use (post-issue loading).

Because the service applications come from a source external to the card manufacturer who is to include them, the latter does not have detailed knowledge of their code and cannot therefore establish suitable management for storing it.

In particular, the manufacturer cannot provide different management of the parts of the code of an application depending on whether they relate to personalisation, whose usefulness is only temporary, or other parts which can be used at any time.

It will be recalled that personalisation of an application is a series of operations performed at an initial stage which makes it possible to individualise it with respect to the holder of the card. The personalisation code contains various commands, referred to as "administrative", for example for loading registers with identification and authorisation codes and other personal data, and for configuring the application according to choices or limits established according to the holder, etc.

SUMMARY OF THE INVENTION

During the personalisation phase, the application is activated, possibly in cooperation with an internal card management program, for executing all the administrative commands necessary for personalisation. Once this personalisation has been correctly performed, the administrative commands no longer have any use, but remain in memory with the rest of the application, unless they can be managed separately. However, these administrative commands may represent several tens of percent of the total space occupied in memory by the application concerned, which limits accordingly the ability of the smart card to accept new applications.

In the light of the above, the object of the invention is to provide an identification of the parts of a set of data to be stored in memory which can therefore be managed separately in order to be able to optimise the storage capacity. Thus, in the case of the aforementioned example, where the data concern all the code forming an application to be personalised, the parts corresponding to the administrative personalisation commands will be identified (i.e. indicated) as such in the code, according to an established convention, so that they can be recognised and managed separately within the card, in particular to release the space which they occupy in memory once the personalisation has been performed.

According to a first aspect, the invention concerns a method of managing data intended to be stored in a memory, the data being intended to be managed in accordance with at least two modes, characterised in that it comprises the steps of:

providing an identification, during a data production phase, for identifying respectively the data intended to be managed in accordance with the various modes, and managing the storage and/or the use of the data on the basis of the identification provided.

In the context of this method, the data intended for a first management mode may be data whose utility is only temporary relative to the data intended for other management modes.

In this case, the object of the invention will more particularly be a method of managing data intended to be stored in a memory, characterised in that it comprises the steps of:

providing an identification, during a data production phase, for those of the data whose utility is only temporary relative to the other data, and managing the storage of the data on the basis of the identification provided.

Advantageously, the identification is integrated in the data.

In one envisaged application, the data comprise code relating to an executable program, part of which, identified as being intended for a first management mode, relates to the code intended to be used only during an initial phase of the program.

The memory may be situated in a communicating device, such as a smart card, the data comprising a code relating to an application, part of which, identified as intended for a first management mode, relates to the personalisation code of the application during an initial phase.

Advantageously, the step of managing the data storage comprises the substeps of:

establishing the addresses in memory of the identified data, detecting the end of the utility of the identified data, and then authorising the reuse of at least some of the said addresses for the subsequent storage of other data at these addresses.

This step can also comprise a step of erasing the identified data after the step of detecting the end of utility.

In this case, it is possible to provide for the switching of the identified data to a specific memory area intended for an operation of erasure or rewriting after their period of utility.

It is possible to envisage, when the data relate to a program written in high-level language, to provide the identification at the level of this language.

By way of example, when the language comprises modules, the identification can be provided by a naming technique, where a name identifiable according to an established convention is allocated to the module or modules of the program associated with the data to be identified.

When the language is typed, the identification can be provided by a typing technique, where a subtyping link to a specified type identifiable according to an established convention is conferred on one or each type of the said program associated with the data to be identified.

In the case of a typed language of the object oriented type, the typing is effected by conferring, on one or each class of the program associated with the data to be identified, a link of inheritance to a specified class, identifiable according to the established convention.

It is also possible to envisage providing the identification at the level of the presentation of the data during storage.

For example, if the data are produced in the form of files or the like, the identification can be provided by designating the file or files associated with the data to be identified, according to an established convention.

If the data are produced in the form of instruction code, the identification can be provided by labelling the instructions relating to the data to be identified, according to an established convention, the labelling being affixed to each instruction concerned or delimiting groups of instructions concerned.

Advantageously, the method can also provide a step of checking the correct identification of the data of temporary utility relative to the other data which for their part are called on to remain in memory, the invention consisting of checking that the data identified as being of only temporary utility are not invoked by the said other data.

In the case where the identified data correspond to code of part of a program intended to be used only during an initial phase of the program, and the other data correspond to code of the rest of the said program, the analysis can consist of checking that no instruction of the code of the rest of the program has recourse to instructions of the code used only during an initial phase of the program.

After the check, provision can also be made for a step of maintaining in memory data identified as being of utility only temporarily, in the same regard as the other stored data, if the checking step reveals an identification error.

The invention can apply to types of management other than those relating to data of temporary utility with respect to others. This is because the management permitted by the identification may serve also in particular for:
- determining the location of the data in the memory, this location depending on the identification;
- the management concerning the routing of the said data within the device, this routing being a function of the said identification. By way of example taken in the context of a multiprocessor device such as a smart card having such means, the routing can be effected to one from amongst several processors, selected according to the said identification;
- the management concerning data encrypting, the encrypting or non-encrypting of the said data being a function of the said identification;
- the management concerning data integrity checks, the said data being subjected to an integrity check according to the said identification;

etc.

According to a second aspect, the invention concerns a system for managing data intended to be stored in a memory, the data being intended to be managed according to at least two modes, characterised in that it comprises:
- identification means for providing an identification, during a data production phase, for identifying respectively the data intended to be managed according to the various modes, and
- means of managing the storage and/or use of the data functioning on the basis of the said identification provided.

The optional aspects of the invention presented above in the context of the method can be applied mutatis mutandis to this system.

According to a third aspect, the invention concerns a programmable smart card comprising a first programmable memory intended for the storage of code constituting an application, and a second memory containing instructions for recognising an identification, according to an established convention, for the administrative code of a loaded application, this code being intended to personalise the application during an initial phase.

BRIEF DESCRIPTION OF THE DRAWINGS

In an envisaged embodiment, the second memory also comprises instructions for authorising the erasure of the administrative code of the first memory active after the end of the personalisation of the application.

The invention and the advantages which stem therefrom will appear more clearly from a reading of the following description of preferred embodiments, given purely by way of non-limiting example, with reference to the accompanying drawings, where.

DETAILED DESCRIPTION OF THE INVENTION

Figure 1:
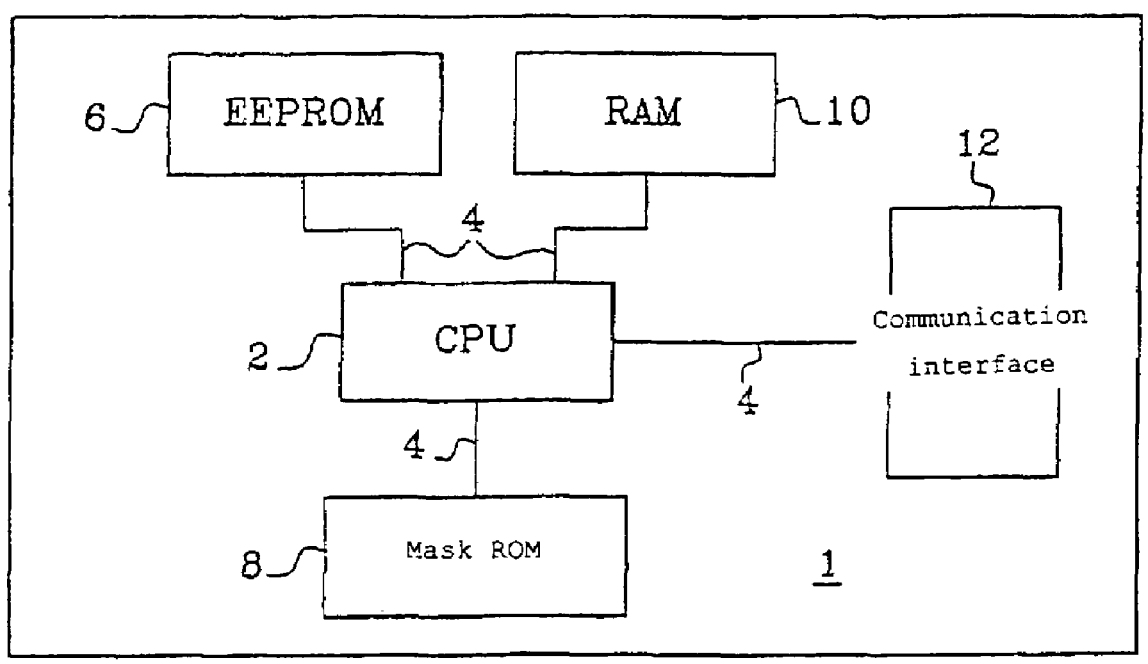
FIG. 1 is a simplified block diagram of the main elements of the smart card.

The basic functional elements of a programmable smart card 1 are depicted in block form in the block diagram in FIG. 1. At the core there is situated a microprocessor (CPU) 2 which provides all the internal management functions of the card, as well as the execution of the applications which are programmed therein. The microprocessor is connected, by a system of internal buses 4, to three types of memory:
- a programmable memory of the read only (ROM) type but electrically erasable and programmable (EEPROM) 6. This memory is intended to be loaded with one or more applications of a service or services which are able to be executed by the microprocessor 2;
- a memory of the mask ROM type 8, containing all the code and the values of software for internal management of the card. These data are entered when the chip is manufactured, at the layer deposition masks. The content of the mask ROM memory 8 being very highly linked to the hardware means of the smart card, the code is normally established by the card manufacturer; and a memory of the random access (RAM) type 10 intended for the storage of temporary data, such as contents of registers, code blocks to be loaded into the microprocessor, etc.

The internal bus 4 is also connected to a communication interface 12 which constitutes a data input and output port vis-à-vis the outside world, and which provides the electrical supply to the card 1. This interface can be in the form of connection pads intended to engage with respective contacts on a reader, and/or an antenna in the case of a so-called contactless card. The communication interface 12 serves amongst other things for the bi-directional exchange of data with a terminal provided for loading an application into the EEPROM memory 6.

Applied to this context of open programmable smart cards, the invention provides a convention between on the one hand the designer of the service application and on the other hand the card manufacturer, aimed at strictly identifying the personalisation, i.e. "administrative", code (the one used solely for personalisation) with respect to the rest of the code, i.e. the "functional" used by the client application. This identification is written in the service application by the designer and is recognised at the level of the management software stored in the mask memory 8.

The management of the EEPROM memory 6 can then be established according to this recognition, in particular by providing an erasure, or a compacting of the data situated at the addresses allocated to the storage of the administrative code once the personalisation is completed.

Figure 2:
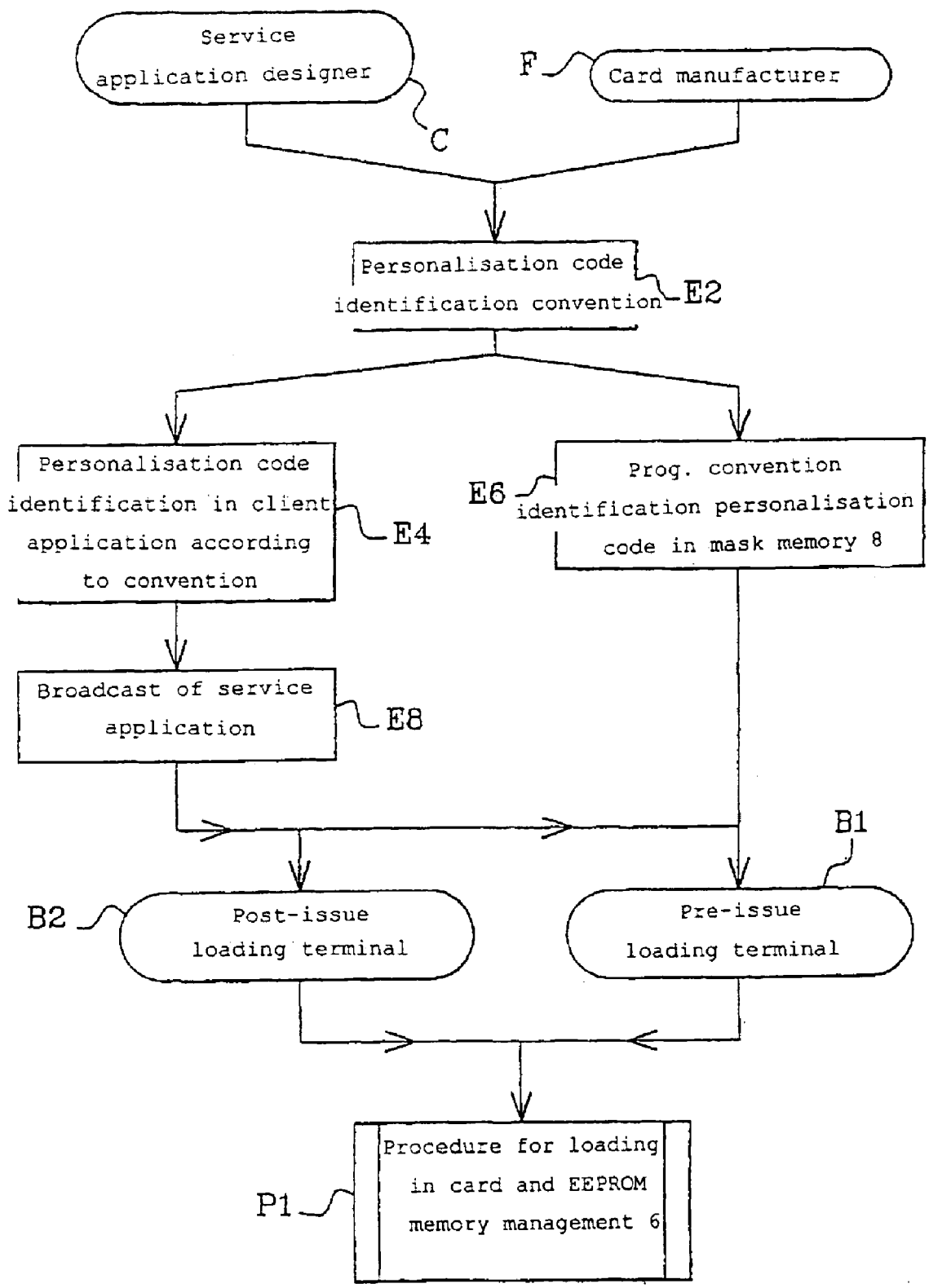
FIG. 2 is a flow diagram of an identification protocol for the parts of the administrative code of an application intended for the smart card of FIG. 1, in accordance with the invention.
Figure 3:
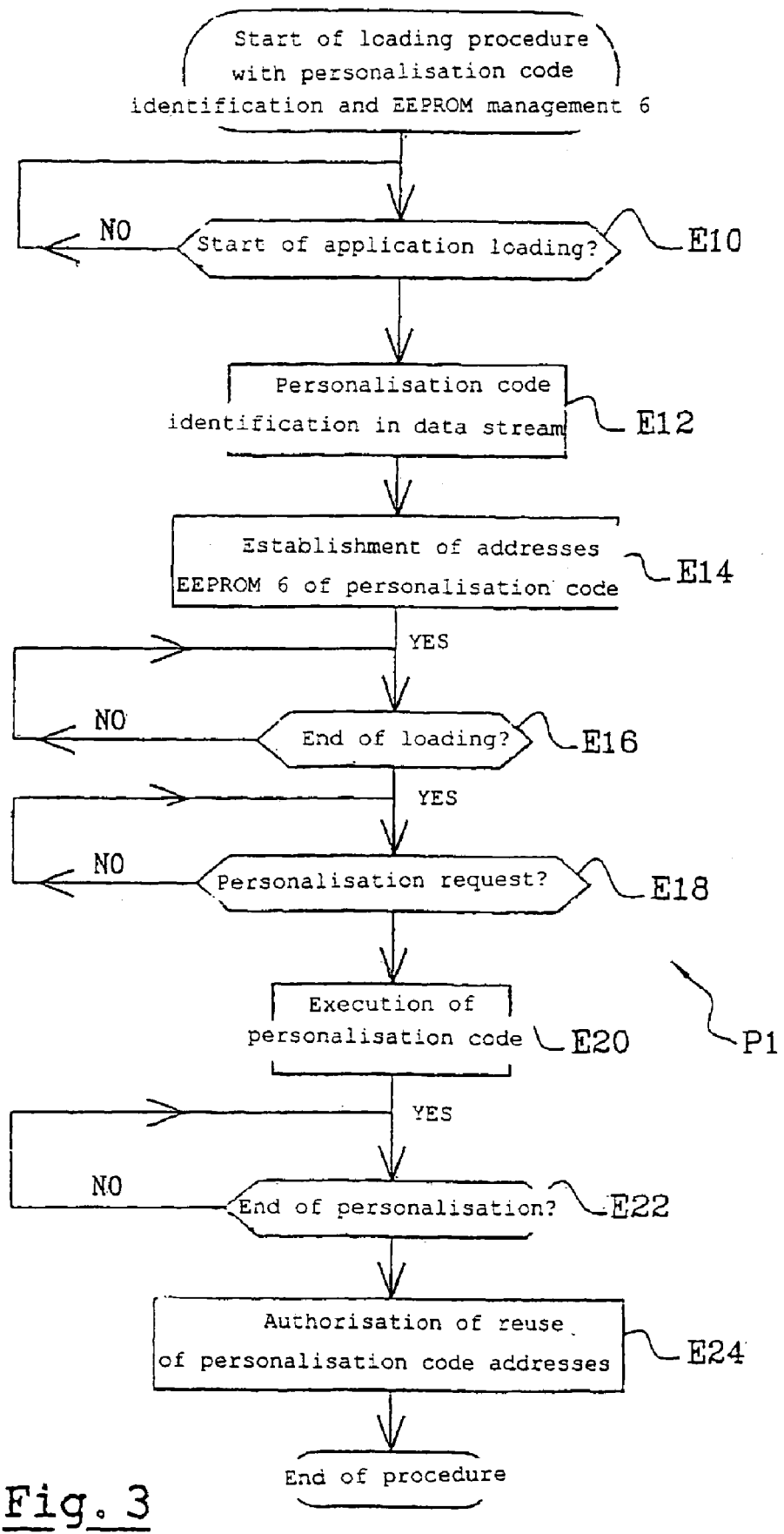
FIG. 3 is a flow diagram of a procedure for loading an application in a card and managing a programmable memory used in the protocol of FIG. 2.

The general concept of such a use of the identification of the administrative code is illustrated by the flow diagrams in FIGS. 2 and 3.

At an initial stage, the designer C of the service application and the manufacturer F of programmable smart cards agree on an identification convention for the administrative code (step E2). This convention provides interoperability between the card and the service application.

On the basis of this convention, the designer provides an identification of the administrative code in his application (by marking, naming, labelling, etc) (step E4). The information constituting this identification is integrated with all the data which constitute the code of the application.

For his part, the manufacturer writes in the mask ROM memory 8 the commands necessary for the recognition of the code thus identified and for the management of this code in EEPROM memory 6, in accordance with a procedure P1 for loading in the card and memory management described hereinafter below (step E6).

The designer, here assimilated to the proprietor using the application, broadcasts the application with a view to its integration in the smart card (step E8). To this end, he transmits it to the manufacturer for loading onto blank cards from a terminal in the factory (pre-issue loading) and, where necessary, on "user" terminals B2 for loading by the holders of the smart cards (post-issue loading). By way of example, a holder can load, by means of a terminal B2, an application for a new commercial service which he wishes to use.

The loading of the application, whether by means of a terminal B1 in the factory or by means of a "user" terminal B2, takes place with the execution of the procedure P1 as a background task, which will be described more particularly with reference to FIG. 3. In general terms, the terminal B1 or B2 comprises a program which manages the loading of an application as having identified on the one hand the personalisation code and on the other hand the application code (functional). This program will load, from the terminal B1 or B2, the entire application code and, in the event of a request for immediate personalisation, engage the personalisation phase with the transmission of the necessary instructions.

The procedure begins with the detection of a loading in the EEPROM memory 6 of an application in the smart card 1 (step E10). When an application loading is detected, the flow of data which constitute the code is analysed in order to identify therein the data relating to the administrative code (step E12). This identification is performed by means of the recognition commands established during step E6, on the basis of the identification convention.

Then in EEPROM 6 the addresses to which the data of the administrative code are allocated are then established (step E14). This step can be performed in two ways:

passive, that is to say by listing in a register (in EEPROM 6 or RAM 10) the series of addresses occupied by the data of the administrative code, without acting on the choice of these addresses, or dynamic, by directing the data of the administrative code to given address areas in EEPROM 6, away from the other data forming the rest of the code.

This establishment process continues until the end of the loading of the application is detected (step E16).

In this way a card loaded with this application is obtained, with the internal identification of the addresses in EEPROM 6 occupied by the administrative code. The procedure then goes into the phase of awaiting a personalisation request, that is to say the execution of the administrative code, vis-à-vis the application loaded. The personalisation can occur at any time after the loading of the application. Typically, it takes place by insertion of the card in a terminal provided for this purpose (for example a bank terminal) at a time chosen arbitrarily by the card holder.

Whenever the card 1 is put in communication with a terminal, the procedure P1 acts once again in order to determine whether a personalisation request has been made (step E18). If such is the case, the personalisation program loaded in the EEPROM memory 6 is executed in a conventional manner (step E20). Personalisation typically entails a dialogue between the card and the terminal, the latter enabling the service provider to enter personal data (identification codes, password, options chosen, etc) via administrative commands. The personalisation will then configure the application within the card, taking account of these personal data (for example in order to verify the personal code at each use, manage exchanges according to the options chosen, etc). It should be noted that the personalisation takes place at the initial stage of the application, once and for all; the configuration of the application on the basis of the personal data is then frozen. Thus the administrative code has no more utility once the personalisation is ended.

At the end of the personalisation (step E12), detected for example whilst remaining awaiting a command or a specific code at termination, the procedure allows the reuse of the addresses of the administrative code located at step E14 (step E24). This authorisation allows several possibilities of management of the EEPROM memory space 6:

the entry of new data at the addresses previously occupied by the administrative code, for example when another application is loaded. In this case, the administrative code can remain present until these addresses in EEPROM memory 6 are requisitioned for other data, the physical erasure of the data of the administrative code, immediately after the authorisation, by a routine executed by the terminal loading program or by the internal management program, or the compacting of the data of the administrative code, making available some of the addresses previously occupied.

This step E24 can be implemented by the internal management program of the card 1 according to conventional techniques of identifying the free addresses in the EEPROM memory 6.

Whichever the possibility chosen, the management makes it possible to recover the space in the EEPROM memory 6 occupied unnecessarily by the personalisation code after its execution.

The personalisation code can be identified in very many different ways, a few examples of which will be given below.

The examples are broken down into two classes: one of which depends on the programming language used for developing the application and one which depends on the way in which the code of the application is stored (in files).

1. Identification of the Personalisation Code by the Programming Language

At the present time, the programming of smart cards takes place by means of relatively high-level languages. It is no longer a case of manipulating large series of instructions with very low-level cutting (close to the machine), but using a greater abstraction in which instructions are grouped together in procedures written in Pascal, Ada, C, etc. In even higher-level languages, levels are passed to where sets of functions which are called modules are grouped together. With even higher-level languages (Java, C++ etc), the procedures and the data which concern the same element are grouped together at the same time in what is referred to as a module or class.

These high-level languages supply high-level abstractions which can be used for identifying the administrative code in an appropriate manner, in accordance with the invention.

A first approach consists of declaring that everything which relates to the administrative code is put in a given module. To this end, it is possible to proceed in two ways: by "naming" or by "typing".

Naming consists of naming this module or modules by means of an expression enabling a third party to recognise it or them as containing the personalisation code, for example by allocating the prefix "perso" to the module, or any other prefix established according to a naming convention between the card manufacturer and the designer of client applications at the aforementioned step E2. Naturally the other modules containing the rest of the code must not use this prefix. In this way, the management software stored in the mask ROM memory 8 of the card can, by reading the module names, know where the code parts intended for the personalisation are situated and act accordingly, for example by putting them at cell addresses which will be subjected to an erasure phase after the personalisation (cf. FIG. 3 steps E12, E14).

The approach based on typing applies to object-oriented languages. These languages use "classes", similar to modules, each defining a "type" of data and associated processings. These types are organised according to a hierarchy of types, ranging from the most general to the most specific, i.e. generally a basic type is found from which there are attached the classes and their instances according to dependency links established, referred to as "inheritance" links, a class "inheriting" from all the classes on which it depends in the hierarchy. It is thus possible to specify that the personalisation classes "inherit" from a specific class dedicated to personalisation, dedicated according to the convention fixed at step E2, for example "perso". The code of the other classes do not inherit from this "perso" class. The "perso" class may be empty, it then being a question of a shell serving solely to create inheritance links. During the programming, it is checked that the codes relating to the personalisation are grouped together in classes which inherit from this "perso" class.

With regard to the smart card, the management software in mask ROM 8 performs an analysis of types when the code is received (cf. FIG. 3 step E12), for the purpose of determining the types of the modules contained in the program. The type of the module specifies its ascending hierarchical links. It is thus possible to determine, by the type of a module, whether the latter inherits, at any hierarchical level, from the "perso" module. If such is the case, it is considered that the module in question comprises personalisation code, to be managed as such at step E14.

2. Identification of the Personalisation Code by the Storage of the Code of the Application.

The two approaches which have just been described act at the time when the developing designer creates his application.

Two other techniques can be envisaged, which act not only at the time of the design of the application but at the time of the transmission of the application to the manufacturer:

1. The designer transmits the codes related to personalisation in a file separate from the file or files containing the rest of the code. The separate file, identifiable as such when the application is loaded (FIG. 3 step E12), can then be located in memory (step E14).

2. The labelling, where a file containing all the code of the application (administrative code and other codes) is transmitted. This file is in the form of a series of instructions (for example from 0 to n). The instructions in this series relating to personalisation are then indicated by a label (also known by the English expression "tag") according to a convention established during the aforementioned step E2. By way of example, a series of personalisation instructions will begin with a label "start of personalisation code" and will end with a label "end of personalisation code".

A label can be associated in front of each personalisation code. In this case, it is necessary to take account of the links between the codes when the instructions are separate.

Figure 4:
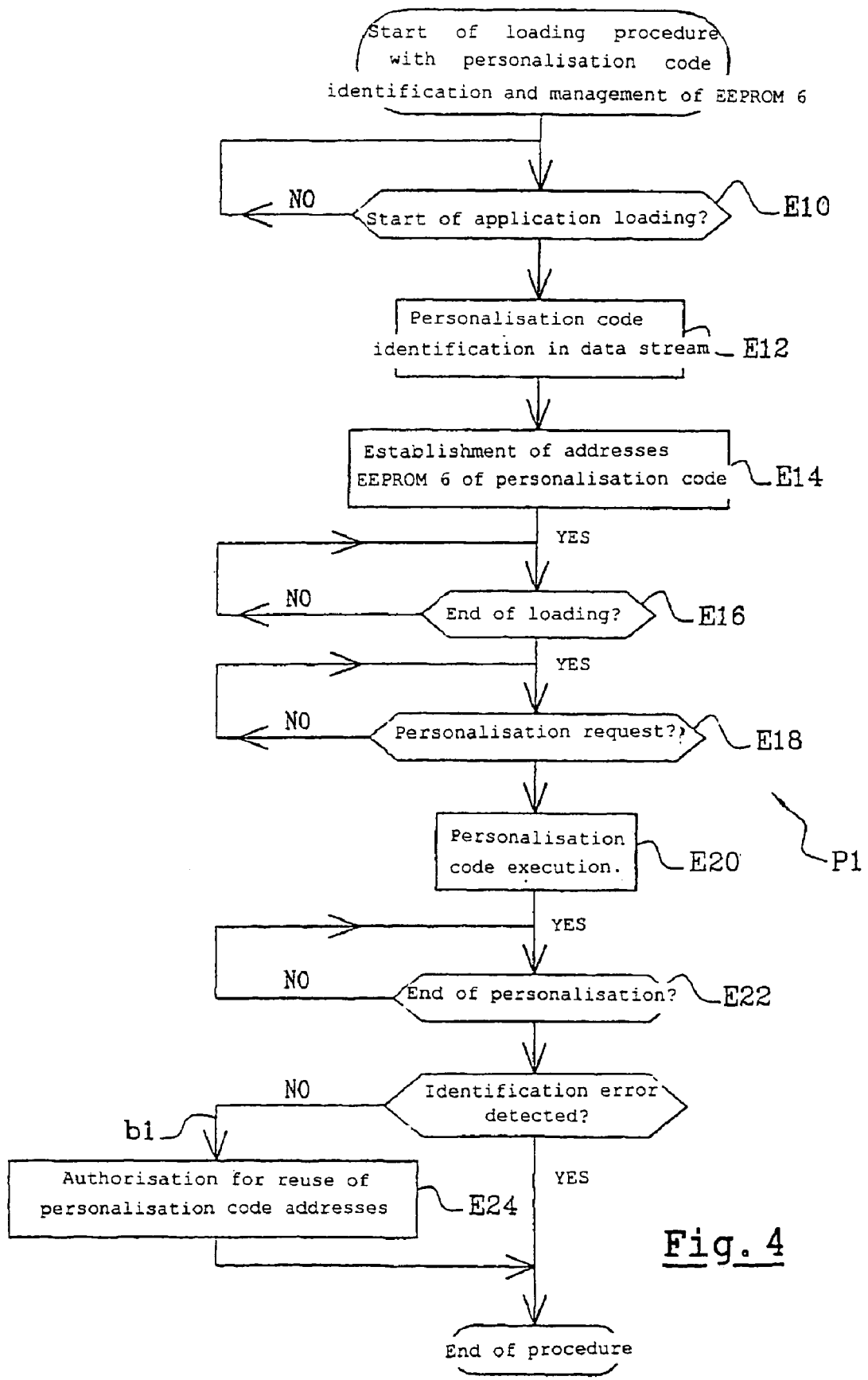
FIG. 4 is a flow diagram of a variant of that of FIG. 3, which incorporates measures for verifying the identification of the data.

There will now be described, with reference to FIG. 4, a variant of the procedure P1 in FIG. 3, which differs from this essentially through the fact that it includes a verification step aimed at determining whether there is an error in the identification. Steps E10–E24 in FIG. 4 are identical to the corresponding ones in FIG. 3 and will not be described again for reasons of conciseness.

Whatever the means used for identifying the personalisation codes amongst the codes of the application, it may happen that some functional code is erroneously identified as personalisation code. This code would then be liable to be erased (step E24) with the consequence of a malfunctioning of the application.

In order to prevent this source of error, the variant also provides a verification step prior to the erasure authorisation step at the personalisation code addresses. This verification may occur at various times in the aforementioned procedure P1, or even at a stage prior to its execution, according to the technique used. The result of the verification is recorded so as to be accessible during the loading of the program which was the subject of this verification. In the example, this result is used just after the end of personalisation (step E22)

in a conditional switching step E26 in order to determine whether or not step E24 of authorising the reuse of the personalisation code addresses is being passed to. If there is no identification error detected, the procedure passes through the authorisation step E24 (branch b1), as in the case in FIG. 3. If there is at least one identification error detected, the procedure bypasses the authorisation step E24. In this case, the data relating to the administrative code are kept in the memory 6 in the same way as the other data of the application.

In general terms, the verification consists of checking that the functional code does not use the administrative code, for example by means of the instruction "go to".

Several techniques can be envisaged for this purpose. For example, the verification can be made at the card 1, after the loading of the application. In this case, the card is managed at step E14 so as to store the personalisation code between two bounded addresses (AP1-APn), and it is checked during the execution of the functional code that there is no jump to addresses situated between AP1 and APn.

The verification can also be carried out outside the card, by performing a code analysis aimed at determining whether the functional code uses the administrative code, which would indicate an error in designating the administrative code.

For example, in an approach by "typing", it is possible to verify that the functional code never has access to objects of the "perso" type.

If such an error is detected following the check, it will be possible to react in an appropriate manner, in particular by inhibiting erasure.

It is clear that the teachings of the invention can take many equivalent forms and apply to other fields.

In the examples described, the identification is attached to the administrative code; however, an equivalent technical effect can be obtained by, conversely, attaching an identification to the application code. In this case, the procedure will be adapted to recognise the administrative code through the absence of an attached identification.

By virtue of the invention, it is possible to manage the data stored in the memory 6 in an intelligent manner, permitting the elimination from the memory of the data relating to the administrative code when these are no longer useful, after personalisation. The memory space thus released can therefore then be used for the storage of other data, corresponding for example to an additional application on the card. There are therefore obtained an optimisation of the use of the memory space 6 and an increase in the possibility of storage of applications or other data.

It should be noted that the invention is in no way limited to the embodiments which have just been described. This is because the invention allows management of many different parameters related to data, as mentioned in the introductory part, where the identification of the data can serve amongst other things to: establish a storage location in memory, establish a routing of the corresponding data, for example to a specific processor amongst several processors associated with the memory, to determine whether the data must be encrypted or not, to determine whether the data must undergo an integrity check and/or the conditions for this check, etc.

What is claimed is:

1. A method of managing data to be stored in a memory, said data being managed in accordance with at least two modes, comprising the steps of:
   providing an identification, during a data production phase, for identifying respectively the data to be managed in accordance with the various modes, and
   managing the storage and/or the use of the data on the basis of the identification provided.

2. A method according to claim 1, wherein data intended for a first management mode comprise data whose utility is only temporary relative to data intended for other management modes.

3. A method according to claim 1, wherein said identification is included in the data.

4. A method according to claim 1, wherein the data comprise code relating to an executable program, part of which, identified as data for a first management mode, relates to the code intended to be used only during an initial phase of the program.

5. A method according to claim 1, wherein the memory is situated in a communicating device, and the data comprise a code relating to an application, part of which, identified for a first management mode, relates to personalization code of the application during an initial phase.

6. A method of managing data to be stored in a memory, said data being managed in accordance with at least two modes, wherein data intended for a first management mode comprise data whose utility is only temporary relative to data intended for other management modes, comprising the steps of:
   providing an identification, during a data production phase, for identifying respectively the data to be managed in accordance with the various modes,
   establishing addresses in memory for the identified data,
   detecting the end of the utility of the identified data, and
   authorizing the reuse of at least some of said addresses for the subsequent storage of other data at said addresses.

7. A method according to claim 6, wherein the step of managing the data storage also comprises a step of erasing the identified data after the step of detecting the end of utility.

8. A method according to claim 2, wherein the step of managing the data storage comprises the switching of identified data to a specific area of the memory intended for an operation of erasing or rewriting after the period of utility.

9. A method according to claim 2, further comprising a step of checking the correct identification of the data of temporary utility relative to the other data, said verification consisting of checking that the data identified as being of only temporary utility are not invoked by said other data.

10. A method according to claim 9, further comprising a step of keeping in memory data identified as being of only temporary utility, in the same way as the other stored data, if the verification step reveals an identification error.

11. A method according to claim 1, wherein the management includes the determination of the location of said data in the memory, said location depending on said identification.

12. A method according to claim 1, wherein the management includes the routing of said data within a device, said routing depending on said identification.

13. A method according to claim 12, wherein the routing is to one of several processors, selected according to said identification.

14. A method according to claim 1, wherein the management includes selectively encrypting data in dependence on said identification.

15. A method according to claim 1, wherein the management includes an integrity check on the data, said data being subjected to an integrity check according to said identification.

16. A method according to claim 1, wherein the data relates to a program written in high-level language, and wherein said identification is supplied at the level of said language.

17. A method of managing data to be stored in memory, wherein said data relates to a program written in high-level language that comprises modules, said data being managed in accordance with at least two modes, comprising the steps of:
    providing an identification, during a data production phase, for identifying respectively the data to be managed by a naming technique, where a name identifiable according to an established convention is allocated to at least one module of said program that is associated with said data to be identified, and
    managing the storage and/or the use of the data on the basis of the identification provided.

18. A method of managing data to be stored in memory, wherein said data relates to a program written in high-level typed language, said data being managed in accordance with at least two modes, comprising the steps of:
    providing an identification, during a data production phase, for identifying respectively the data to be managed by a typing technique, where a subtyping link to a specified type identifiable according to an established convention is conferred on at least one type of said program that is associated with said data to be identified, and
    managing the storage and/or the use of the data on the basis of the identification provided.

19. A method according to claim 1, wherein the data are produced in the form of files, and said identification is provided by designating the file or files associated with said data to be identified, according to an established convention.

20. A method according to claim 1, wherein the data are produced in the form of instruction code, and said identification is provided by labelling the instructions relating to said data to be identified, according to an established convention, wherein the labelling is affixed to each of said instructions or delimiting groups of said instructions.

21. A method according to claim 1, wherein said memory is situated in a programmable smart card.

22. A system for managing data to be stored in a memory, the data being managed according to at least two modes, comprising:
    identification means for providing an identification, during a data production phase, that respectively identifies the data to be managed according to various modes, and
    means for managing the storage and/or use of the data on the basis of said identification.

23. A system according to claim 22, wherein the data intended for a first management mode are data whose utility is only temporary relative to data intended for a second management mode.

24. A system according to claim 22 wherein said identification means comprise a data structure that provides said identification in the data.

25. A system according to claim 22, wherein the data comprise code relating to an executable program, part of which, identified for a first management mode, relates to code intended to be used only during an initial phase of the program.

26. A system according to claim 22, wherein the memory is situated in a communicating device, and the data comprise code relating to an application, part of which, identified for a first management mode, relates to application personalization code during an initial phase.

27. A system for managing data to be stored in a memory according to at least two modes, wherein the data intended for a first management mode is data whose utility is only temporary relative to data intended for a second management mode, comprising:
    identification means for providing an identification, during a data production phase, that respectively identifies the data to be managed according to various modes,
    means for establishing addresses in memory for the identified data,
    means for detecting the end of the utility of the identified data, and
    means for authorizing the reuse of at least some of said addresses for the subsequent storage of other data at said addresses.

28. A system according to claim 27, wherein the management means also comprise means for erasing identified data after the detection of said end of the utility of the identified data.

29. A system according to claim 22, wherein the management means comprise means for switching identified data to a specific memory area intended for an operation of erasure or rewriting after the period of utility.

30. A system according to claim 23, further comprising means for checking the correct identification of the data of temporary utility relative to the other data, said verification means establishing whether the data identified as being only of temporary utility are invoked by said other data.

31. A system according to claim 30, further comprising means for keeping in memory data identified as being of only temporary utility, in the same way as the other stored data, if the verification means reveal an identification error.

32. A system according to claim 22, wherein the management means determine the location of said data in the memory in dependence upon said identification.

33. A system according to claim 22, wherein the management means establish the routing of said data within a device, in dependence upon said identification.

34. A system according to claim 33, wherein the routing is to one of several processors, selected according to said identification.

35. A system according to claim 22, wherein the management means selectively encrypts the data in dependence upon said identification.

36. A system according to claim 22, wherein the management means check the integrity of the data, said data being subjected to an integrity check according to said identification.

37. A system according to claim 22, wherein said memory is situated in a programmable smart card.

38. A programmable smart card comprising a first programmable memory for the storage of code constituting an application, and a second memory containing instructions for recognizing an identification, according to an established convention, of administrative code of a loaded application for personalizing the application during an initial phase.

39. A smart card according to claim 38, wherein the second memory also comprises instructions for the authorization of erasure of the administrative code of the first memory after the end of the personalization of the application.

* * * * *